Aug. 19, 1941.  J. VASSOS ET AL  2,252,873
ARTICLE OF MANUFACTURE
Filed July 8, 1938   2 Sheets-Sheet 1

Joseph J. Callahan
John Vassos   INVENTORS

BY *[signature]*
ATTORNEY.

Aug. 19, 1941.                J. VASSOS ET AL                 2,252,873
                           ARTICLE OF MANUFACTURE
                             Filed July 8, 1938              2 Sheets-Sheet 2

Joseph J. Callahan
John Vassos      INVENTORS
BY
                 ATTORNEY

Patented Aug. 19, 1941

2,252,873

UNITED STATES PATENT OFFICE 2,252,873

ARTICLE OF MANUFACTURE

John Vassos, New Canaan, and Joseph J. Callahan, Bridgeport, Conn., assignors to Remington Arms Company, Inc., a corporation of Delaware Application July 8, 1938, Serial No. 218,096

1 Claim. (Cl. 294—7)

This invention relates to implements (for example, cutlery) and supporting racks therefor, and more particularly to a tool handle slotted to provide for the entry of a supporting bar of an implement rack.

The problem of supporting tools, kitchen implements and the like in a convenient place when not in use, is one of long standing. That the previously proposed solutions of this problem have not obtained public acceptance has been due at least partially to the fact that the supporting means favored fumbling and in addition was so constructed as to be capable of injuring, or at least of discomforting (inconveniencing) the person handling the implement.

It has now been found that a satisfactory implement supporting handle can be made by making, in a handle of acceptable proportions and contours, an inclined slot. In the preferred embodiment of this invention a slot capable of receiving and adapted to receive the supporting bar of a rack is made in a handle of standard form. Preferably this slot is inclined at about 30° with the lengthwise direction of the implement, and is opened toward the back side and functional end of the utensil. By locating this slot near the end of the handle opposite that connected to the remainder of the implement, an efficient device admirably suited to the aforementioned purposes is obtained.

From the following description, in which are disclosed certain embodiments of the invention as well as details of what is believed to be the best mode for carrying out the invention, it will be apparent how the foregoing objects and related ends are accomplished. The written description is amplified by the accompanying drawings, in which.

Similar characters refer to similar parts throughout the drawings.

Figure 1:
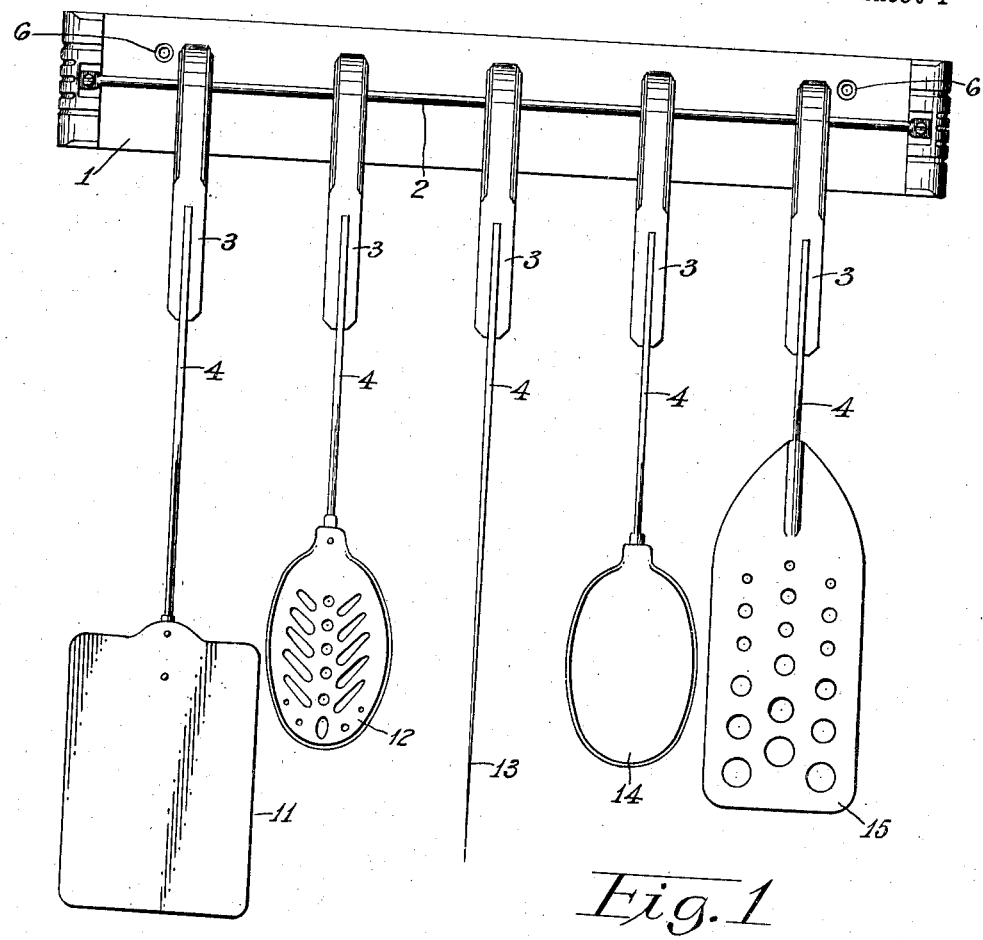
Figure 1 is a front elevation view showing a rack supporting a number of kitchen implements.

In general the invention comprises a rack and one or more supported implements (see Figure 1). The rack comprises a back portion 1, and an implement supporting bar or rod 2, which is adapted to be received in a slot in the handle 3 of a tool or implement. Ordinarily the implement comprises a functional portion 4 (such as the blade of a knife, the tines of a fork and the like), and a separate handle portion 3 more or less permanently attached thereto. The implements illustrated in Figure 1 are a cake turner 11, a perforated spoon 12, a knife 13, a spoon 14 and a perforated spatula 15.

Preferably the ends of the said back portion are raised for the purpose of spacing the supporting rod from the central part of the back portion. This feature is shown in perspective in Figure 7. These raised end portions may be formed by molding or laminating when the back is made of plastic material, or may constitute pressed out portions of the back when it is made of metal.

Figure 7:
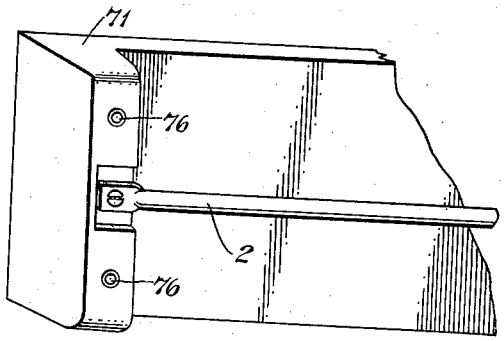
Figure 7 is a perspective view of one end of the implement rack showing one means of attaching the supporting bar and one means of securing the rack to a supporting surface, such as a wall.

The rack may be fastened to a supporting wall or the like in any desired manner. In Figure 1 the method illustrated is by means of screws, the holes 6 in the middle section of the back being provided for the same. In Figure 7 the holes 76 for this purpose are provided in the raised end portions of the rack. This modification requires somewhat longer fastening screws, but has the advantage of strengthening the raised end portion, and in addition it leaves the center portion of the back of the rack free from projections which would interfere with ready cleaning, such as by wiping with a cloth.

Figure 2:
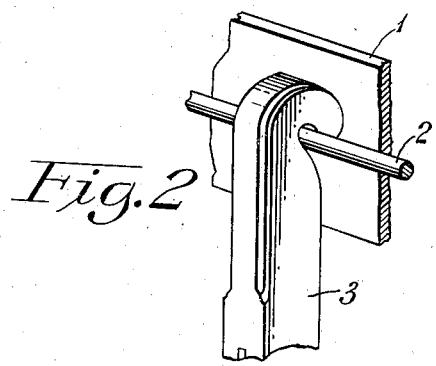
Figure 2 is a perspective view of a portion of the rack and a portion of a suspended implement handle.
Figure 4:
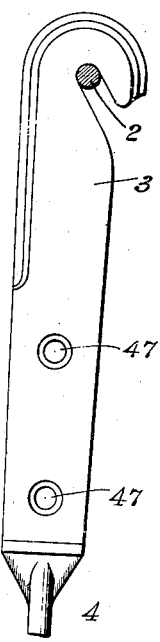
Figure 4 is a fragmentary elevation of a cutlery article held on the preferred form of supporting bar.
Figure 5:
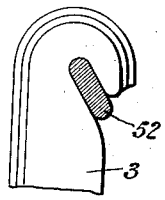
Figure 5 is a fragmentary elevation view showing a portion of an implement handle supported on another form of supporting bar.
Figure 6:
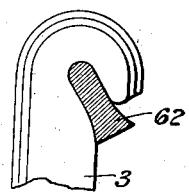
Figure 6 is a fragmentary end view showing a portion of an implement handle supported on still another form of supporting bar.

The supporting rod or bar may have any desired cross-section. It is round in the preferred embodiment shown in Figures 2 and 4. In Figure 5 it is flat with rounded edges, as shown at 52. Figure 6 shows a bar 62 which is generally flat but is widened at the base to substantially conform to the shape of the entrance portion of the handle slot. The forms shown in Figures 5 and 6 have the advantage that the implements are supported in a manner that prevents their swinging to and fro.

Previous efforts to design a device accomplishing the purposes of this invention have not been crowned with any desirable degree of success (public acceptance) because the implement handles provided had undesirable excrescences or projections thereon. These features made it necessary to hold the implement in an unnatural, unstable or strained position, and in addition offered difficulties in cleaning because cleaning cloths readily caught on the same. In some devices edges sufficiently sharp to tear the hand of the operator when carelessly handled, were provided. All these disadvantages are avoided in the present device where the implement handle has a natural (standard) external contour. The inclined slot by which the implement is supported has a cut-away portion which cannot interfere with the normal handling of the instrument, and is not apt to injure the hand of an operator even when special care in handling is not exercised. This highly important feature and its advantages will be quickly apparent from a consideration of Figures 2 and 4, in which a handle is fully illustrated.

The handle may be fastened or secured to the remaining part of the implement in any desired manner. In Figure 4 the two parts are shown as riveted together, the rivets being generally indicated at 47. Details of this kind are well known to those skilled in the art and need not be further discussed here.

Figure 8:
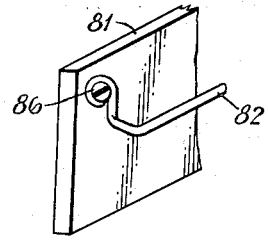
Figure 8 is a perspective view showing a modified form of rack.

In Figure 7 the raised end portion of the back of the rack is clearly shown at 71. While such portions may be satisfactorily formed by plastic molding operations, it is less expensive to form the same by laminating premolded layers (slabs of a suitable plastic).

Where the weight of the implements to be supported permits, the supporting rod may be appropriately bent and secured to a back which does not have raised portions as shown in Figure 8. Here the back 81 comprises merely a layer or sheet of the desired material to which is fastened the supporting rod 82, having turned in ends. These two parts (back and supporting rod) are secured together by means of a screw 86 which goes through an eye in the end of the supporting rod. If desired, this screw 86 may be of sufficient length to not only secure the back and supporting rod together, but also to secure the entire assembly to a supporting wall.

Instead of bending the end of the supporting rod 82 to form a spacing portion, a metal bracket 105 (shown in Figure 10) may be employed. This bracket, which is U-shaped in cross-section, may be secured to the back 101 by means of screws (or rivets) indicated at 106. The supporting bar 102 has its ends bent to form a hook (or eye) through which a screw 108 threaded into the outside arm of the U-shaped bracket forms the means of fastening.

Figure 3:
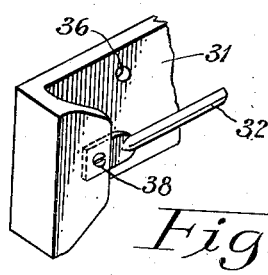
Figure 3 is a fragmentary end view in perspective of a modified form of the rack.
Figure 10:
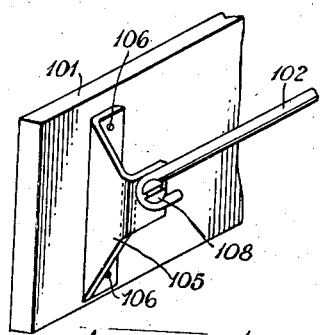
Figure 10 is a perspective view of a further modification of the rack.

When the back of the rack is made of metal, the ends may be turned over to form an integral bracket (or spacing element) having a function similar to that of the separable bracket 105 of Figure 10, and the bent rod equivalent in Figure 8. Such a modification is illustrated in Figure 3. The supporting bar 32 similar to bar 2 in Figure 1 is secured inside the bent over end portion by means of the screw 38. The back 31 has holes 36 through which means for fastening the implement holder to a wall may be inserted.

Figure 9:
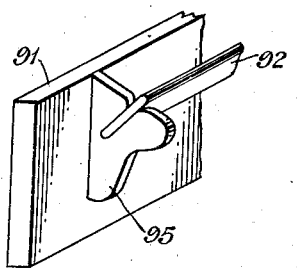
Figure 9 is a perspective view showing a still further modified form of rack in which the implement supporting bar is readily removable (quickly separable) from the remainder of the rack.

For some uses of the present invention it may be desirable to have the supporting bar easily detachable from the back of the rack. This facilitates easy cleaning and washing which may be desirable in the case of kitchen utensils and cutlery. Such a modification is illustrated in Figure 9, where 91 indicates a back having a supporting bracket 95 attached thereto (or formed integrally therewith if desired). A supporting bar 92 is anchored in the supporting bracket by means of a slot of the same general shape as the bar itself. No extra means of fastening (or anchoring) is provided, since the slot is dimensioned to fit fairly tightly about the supporting bar. This permits quick removal and replacement of the supporting bar.

The back of the rack may be made of any of the usual constructional materials, such as wood, pressed metal and plastics. Among the plastics (or resinous materials) particularly suited for this purpose there may be mentioned phenol-formaldehyde resins, urea-formaldehyde resins, cellulose acetate, methyl methacrylate, and vinyl compounds such as mixtures of vinyl chloride and vinyl acetate.

The utensil supporting bar of the rack is ordinarily constructed of metal, and if desired may be plated to enhance its appearance. Such metals as ordinary steel, stainless steel, copper, brass, aluminum, aluminum alloys, magnesium alloys and the like, are especially suitable. The most common plating metals ordinarily employed are nickel and chromium.

The implement handles may be prepared from any of the materials well known in this field. For purposes of illustration mention may be made of bone, wood, metal, hard neoprene compositions, hard rubber, plastics, laminated leather, and the like.

As many apparently widely different embodiments of this invention may be made without departing from the spirit and scope thereof, it is to be understood that we do not limit ourselves to the specific embodiments thereof except as defined in the appended claim.

We claim:

A household utensil comprising a functional portion of metal having an integral shank extending therefrom, a formed handle of a dissimilar material partially housing and rigidly secured to said shank, said formed handle being of such width and thickness as to constitute an adequate hand grip and having substantially the same width and thickness throughout its length, an open-ended slot formed within the width and thickness and extending through the thickness of said handle, the margins of said slot being inclined toward the free end of said handle and being substantially flat in the direction of the thickness of said handle whereby said slot is adapted to receive a support in a manner which minimizes transverse sway of the utensil upon the support.

JOHN VASSOS.
JOSEPH J. CALLAHAN.